(12) United States Patent
Cook (10) Patent No.: US 10,520,335 B2
(45) Date of Patent: Dec. 31, 2019

(54) WINDING CONFIGURATION FOR INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 71 days.

(21) Appl. No.: 15/245,560

(22) Filed: Aug. 24, 2016

(65) Prior Publication Data

US 2018/0058883 A1     Mar. 1, 2018

(51) Int. Cl.
G01D 5/20     (2006.01)
G01B 3/20     (2006.01)

(52) U.S. Cl.
CPC .............. G01D 5/202 (2013.01); G01B 3/205 (2013.01)

(58) Field of Classification Search
CPC ...... G01D 5/202; G01D 5/204; G01D 5/2026; G01D 5/2053; G01D 5/2086; G01D 5/244; G01D 5/2492; G01D 5/2497; G01D 5/25; G01D 5/2451; G01D 5/347; G01D 5/34776; G01J 1/0266; G01J 3/0289; G01J 5/089; G01B 7/14; G01B 3/004; G01B 3/02; G01B 3/20; G01B 3/205

(Continued)

(56) References Cited

U.S. PATENT DOCUMENTS

| | | | | | |
|---|---|---|---|---|---|
| 5,841,274 A | * | 11/1998 | Masreliez | ............ | G01D 5/2053 324/207.17 |
| 5,886,519 A | * | 3/1999 | Masreliez | .............. | G01B 3/205 324/207.17 |

(Continued)

FOREIGN PATENT DOCUMENTS

| | | |
|---|---|---|
| CN | 1272620 A | 11/2000 |
| CN | 1441226 A | 9/2003 |

(Continued)

OTHER PUBLICATIONS

Microwaves 101, "Skin Depth", www.microwaves101.com, Oct. 2014. (Year: 2014).*

(Continued)

Primary Examiner — Patrick Assouad
Assistant Examiner — Sean Curtis
(74) Attorney, Agent, or Firm — Seed IP Law Group LLP (57) ABSTRACT

An electronic position encoder is provided including a scale, a detector and a signal processing configuration. The scale extends along an x-axis direction and includes a signal modulating scale pattern. The detector includes sensing elements and a field generating coil that surrounds an interior coil area. The field generating coil includes first and second elongated portions that each extend along the x-axis direction, connected by an end portion. The elongated portions have a nominal generating trace width dimension along the y-axis direction that is at least 0.1 times the nominal interior coil area width dimension in various embodiments. In various implementations, a conductive shield region of the detector may reduce the effect of a shielded end section of the end portion of the field generating coil on the sensing elements. The shielded end section may be located on a different PCB layer than the elongated portions.

20 Claims, 6 Drawing Sheets

(58) Field of Classification Search
USPC .............. 324/207.15–207.17, 207.23–207.26
See application file for complete search history.

(56) References Cited

U.S. PATENT DOCUMENTS

| | | | | |
|---|---|---|---|---|
| 5,894,678 | A | 4/1999 | Masreliez et al. | |
| 5,901,458 | A * | 5/1999 | Andermo | G01D 5/2086 |
| | | | | 324/207.24 |
| 5,936,399 | A * | 8/1999 | Andermo | G01D 5/202 |
| | | | | 324/207.17 |
| 5,973,494 | A * | 10/1999 | Masreliez | G01D 5/2046 |
| | | | | 324/207.17 |
| 5,998,990 | A * | 12/1999 | Andermo | G01D 5/2086 |
| | | | | 324/207.12 |
| 6,002,250 | A * | 12/1999 | Masreliez | G01D 5/2053 |
| | | | | 324/207.16 |
| 6,011,389 | A * | 1/2000 | Masreliez | G01D 5/2046 |
| | | | | 324/207.17 |
| 6,049,204 | A * | 4/2000 | Andermo | G01B 7/02 |
| | | | | 324/207.12 |
| 6,124,708 | A | 9/2000 | Dames | |
| 6,329,813 | B1 * | 12/2001 | Andermo | G01B 3/205 |
| | | | | 324/207.12 |
| 6,335,618 | B1 * | 1/2002 | Nahum | G01B 3/205 |
| | | | | 324/207.17 |
| 6,400,138 | B1 * | 6/2002 | Andermo | G01B 3/205 |
| | | | | 324/207.12 |
| 6,522,129 | B2 * | 2/2003 | Miyata | G01D 5/2053 |
| | | | | 324/207.16 |
| 6,531,866 | B2 * | 3/2003 | Miyata | G01D 5/2086 |
| | | | | 324/207.12 |
| 6,545,461 | B1 * | 4/2003 | Miyata | G01D 5/2053 |
| | | | | 324/207.17 |
| 6,573,707 | B2 * | 6/2003 | Kiriyama | G01D 5/2086 |
| | | | | 324/207.17 |
| 6,628,115 | B2 * | 9/2003 | Sasaki | G01B 7/003 |
| | | | | 324/207.17 |
| 6,646,433 | B2 * | 11/2003 | Milvich | G01D 5/2053 |
| | | | | 324/207.12 |
| 6,646,434 | B2 * | 11/2003 | Miyata | G01D 5/208 |
| | | | | 324/207.17 |
| 6,714,004 | B2 * | 3/2004 | Jagiella | F15B 15/2846 |
| | | | | 324/207.16 |
| 6,720,760 | B2 * | 4/2004 | Milvich | G01D 5/2086 |
| | | | | 324/207.17 |
| 7,015,687 | B2 * | 3/2006 | Meyer | G01D 5/2053 |
| | | | | 324/207.17 |
| 7,239,130 | B1 * | 7/2007 | Milvich | G01D 5/2086 |
| | | | | 324/207.12 |
| 7,530,177 | B1 * | 5/2009 | Meichle | G01B 3/205 |
| | | | | 33/708 |
| 7,652,469 | B2 * | 1/2010 | Meyer | G01D 5/202 |
| | | | | 324/207.15 |
| 7,906,958 | B2 * | 3/2011 | Nakayama | G01D 5/2073 |
| | | | | 324/207.15 |
| 8,309,906 | B2 * | 11/2012 | Kapner | G01D 5/24476 |
| | | | | 250/231.16 |
| 8,847,583 | B2 * | 9/2014 | Sasaki | G01D 5/2086 |
| | | | | 324/207.17 |
| 8,928,311 | B2 * | 1/2015 | Sasaki | G01D 5/2073 |
| | | | | 324/207.17 |
| 9,267,819 | B2 * | 2/2016 | Cook | G01D 5/20 |
| 9,325,060 | B2 * | 4/2016 | Kalistaja | H05K 3/125 |
| 9,435,663 | B2 * | 9/2016 | Cook | G01D 5/2066 |
| 9,612,136 | B1 * | 4/2017 | Cook | G01D 5/2455 |
| 9,678,701 | B2 * | 6/2017 | Cook | G01B 3/205 |
| 9,833,802 | B2 * | 12/2017 | Kalistaja | H05K 3/1241 |
| 9,958,294 | B2 * | 5/2018 | Cook | G01D 5/20 |
| 2001/0003422 | A1 * | 6/2001 | Andermo | G01D 5/2495 |
| | | | | 324/207.17 |
| 2002/0030484 | A1 * | 3/2002 | Kiriyama | G01D 3/08 |
| | | | | 324/207.17 |
| 2002/0030485 | A1 * | 3/2002 | Gleixner | G01D 5/2073 |
| | | | | 324/207.17 |
| 2003/0090264 | A1 * | 5/2003 | Milvich | G01D 5/2086 |
| | | | | 324/207.16 |
| 2003/0128028 | A1 * | 7/2003 | Jordil | G01B 3/205 |
| | | | | 324/207.21 |
| 2003/0160608 | A1 * | 8/2003 | Milvich | G01D 5/2053 |
| | | | | 324/207.17 |
| 2006/0103376 | A1 * | 5/2006 | Ma | G01B 3/205 |
| | | | | 324/207.24 |
| 2010/0001718 | A1 * | 1/2010 | Howard | G01B 7/003 |
| | | | | 324/207.15 |
| 2011/0254541 | A1 * | 10/2011 | Sasaki | G01D 5/2086 |
| | | | | 324/207.15 |
| 2012/0007591 | A1 * | 1/2012 | Howard | G01B 7/003 |
| | | | | 324/207.15 |
| 2014/0184202 | A1 * | 7/2014 | Horiguchi | G01D 5/24438 |
| | | | | 324/207.11 |
| 2015/0375246 | A1 * | 12/2015 | Kalistaja | H05K 3/1241 |
| | | | | 174/250 |
| 2016/0054154 | A1 * | 2/2016 | Cook | G01D 5/2066 |
| | | | | 324/207.17 |
| 2016/0146636 | A1 * | 5/2016 | Nahum | G01D 5/2053 |
| | | | | 324/207.17 |
| 2017/0089738 | A1 * | 3/2017 | Cook | G01D 5/2455 |
| 2018/0180452 | A1 * | 6/2018 | Cook | G01D 5/34792 |
| 2019/0120660 | A1 * | 4/2019 | Hitchman | G01D 5/2053 |

FOREIGN PATENT DOCUMENTS

| | | | | |
|---|---|---|---|---|
| CN | 105415882 A | | 3/2016 | |
| EP | 1 014 041 B1 | | 5/2005 | |
| JP | 2018004628 A | * | 1/2018 | .............. G01D 5/20 |
| JP | 2018031777 A | * | 3/2018 | ............. G01D 5/202 |
| JP | 2018105854 A | * | 7/2018 | ......... G01D 5/34792 |

OTHER PUBLICATIONS

Cook, "Absolute Position Encoder Including Scale With Varying Spatial Characteristic and Utilizing Fourier Transform or Other Signal Processing," U.S. Appl. No. 15/199,723, filed Jun. 30, 2016, 35 pages.
Wikipedia, "Ground Plane," screen captured Apr. 9, 2016, downloaded from https://web.archive.org/web/20160409231546/https://en.wikipedia.org/wiki/Ground_plane on Apr. 24, 2018, 3 pages.
Wikipedia, "Skin effect," screen captured Mar. 2, 2016, downloaded from https://web.archive.org/web/20160402204748/https://en.wikipedia.org/wiki/Skin_effect on Apr. 24, 2018, 9 pages.
Chinese Office Action, dated Jul. 2, 2019, for Chinese Application No. 2017107342215, 22 pages. (with English Translation).

* cited by examiner

WINDING CONFIGURATION FOR INDUCTIVE POSITION ENCODER

BACKGROUND

Technical Field

This disclosure relates to measurement instruments, and more particularly to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. Magnetic and inductive transducers are relatively robust to contamination, but not perfectly so.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. All of the foregoing are hereby incorporated herein by reference in their entireties. As described in these patents, an induced current transducer may be manufactured using printed circuit board technology and is largely immune to contamination. However, such systems may be limited in their ability to provide certain combinations of features desired by users, such as combinations of compact size, high resolution, cost, robustness to contamination, etc. Configurations of encoders that provide improved combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction that coincides with an x-axis direction. In various implementations, the electronic position encoder includes a scale, a detector portion and a signal processing configuration. The scale extends along the measuring axis direction and includes a signal modulating scale pattern. The scale pattern has a scale pattern width dimension along a y-axis direction that is perpendicular to the x-axis direction and has a spatial characteristic which changes as a function of position along the x-axis direction.

The detector portion is configured to be mounted proximate to the scale pattern and to move along the measuring axis direction relative to the scale pattern. In various implementations, the detector portion includes a field generating coil and a plurality of sensing elements. The field generating coil is fixed on a substrate and surrounds an interior area having a nominal coil area length dimension along the x-axis direction and a nominal coil area width dimension along the y-axis direction. The field generating coil generates a changing magnetic flux in the interior area in response to a coil drive signal. The plurality of sensing elements are arranged along the x-axis direction and are fixed on the substrate. Each of the sensing elements has a nominal sensing element width dimension along the y-axis direction, wherein at least a majority of the nominal sensing element width dimension is included within the nominal coil area width dimension along the y-axis direction. The sensing elements are configured to provide detector signals which respond to a local effect on the changing magnetic flux provided by an adjacent signal modulating portion of the scale pattern. The signal processing configuration is operably connected to the detector portion to provide the coil drive signal and to determine the relative position between the detector portion and the scale pattern based on detector signals input from the detector portion.

In various implementations, the field generating coil includes an input portion, first and second elongated portions, and at least a first end portion. The input portion includes at least two connection portions that connect to the signal processing configuration and input the coil drive signal to the field generating coil. The first and second elongated portions each extend along the x-axis direction adjacent to a side of the interior area, and each have a nominal generating trace width dimension along the y-axis direction. The first end portion spans a y-axis direction separation between the first and second elongated portions to provide a connection therebetween near an end of the interior area. In various implementations, the field generating coil is configured such that the nominal generating trace width dimension is at least 0.1 times the nominal coil area width dimension. In some implementations, the field generating coil may be configured such that the nominal generating trace width dimension is at least 0.15 times, or at least 0.25 times, or at least 0.50 times the nominal coil area width dimension. In some implementations, the field generating coil may be configured such that the nominal generating trace width dimension is at least 25 times the skin depth of the elongated portions at a nominal operating frequency defined corresponding to detector signals that arise in response to the changing magnetic flux.

In various implementations, the first and second elongated portions may be nominally located at an elongated portion z distance from a front surface of the detector portion that faces the scale pattern, along a z axis direction that is perpendicular to the x-axis and y-axis directions. The first end portion may include a shielded end section that is nominally located at a shielded end section z distance from the front surface of the detector portion, wherein the shielded end section z distance is greater than the elongated portion z distance. The detector portion may further include a conductive shield region that extends along the x-axis and y-axis directions and may be nominally located at a shield region z distance from the front surface, wherein the shield region z distance is smaller than the shielded end section z distance, and the shield region is located between at least part of the shielded end section and the front surface of the detector portion.

DETAILED DESCRIPTION

Figure 1:
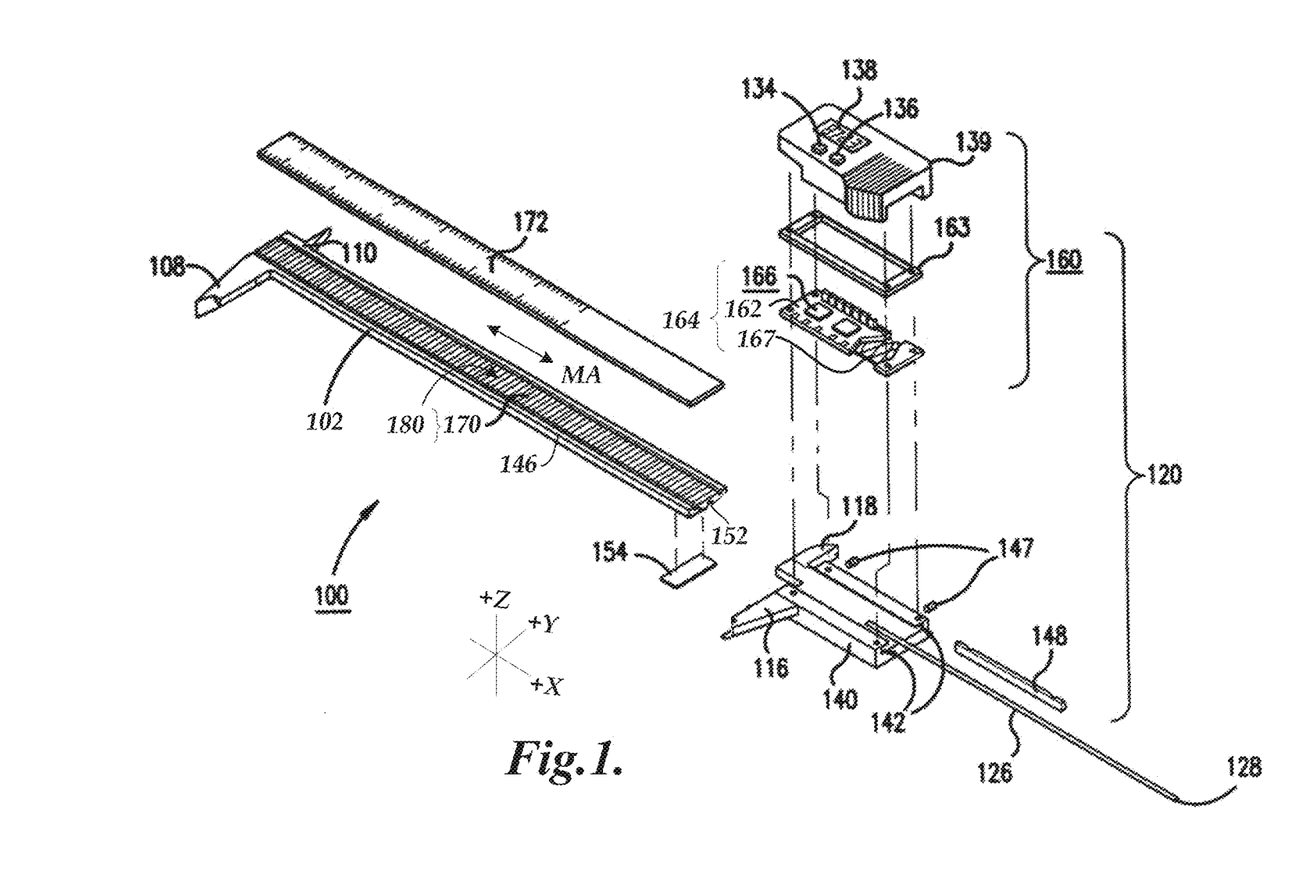
FIG. 1 is an exploded isometric view diagram of a hand tool type caliper utilizing an electronic position encoder including a detector portion and a scale.

FIG. 1 is an exploded isometric view diagram of a hand tool type caliper 100 including a scale member 102 having a spar of roughly rectangular cross-section including a scale 170, and slider assembly 120. In various implementations, the scale 170 may extend along the measuring axis direction MA (e.g., corresponding to an x-axis direction) and may include a signal modulating scale pattern 180. A known type of cover layer 172 (e.g., 100 µm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include an on/off switch 134, a zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes substrate 162 (e.g., a printed circuit board) that carries a detector portion 167 including a field generating coil and a group of sensing elements (e.g., collectively a field generating and sensing winding configuration) arranged along the measuring axis direction MA, and a signal processing configuration 166 (e.g., a control circuit). A resilient seal 163 may be compressed between the cover 139 and the substrate 162 to exclude contamination from the circuitry and connections. The detector portion 167 may be covered by an insulative coating.

In one specific illustrative example, the detector portion 167 may be arranged parallel with and facing the scale 170, and a front face of the detector portion 167 that faces the scale 170 may be separated from the scale 170 (and/or the scale pattern 180) by a gap on the order of 0.5 mm along the depth (Z) direction. Together, the read head portion 164 and the scale 170 may form a transducer as part of an electronic position encoder. In one implementation, the transducer may be an eddy current transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below. It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, and robustness to contamination, etc. Even small improvements in any of these factors are highly desirable, but difficult to achieve, especially in light of the design constraints imposed in order to achieve commercial success in the various applications. The principles disclosed in the following description provide improvements in a number of these factors in a particularly cost effective and compact manner.

Figure 2:
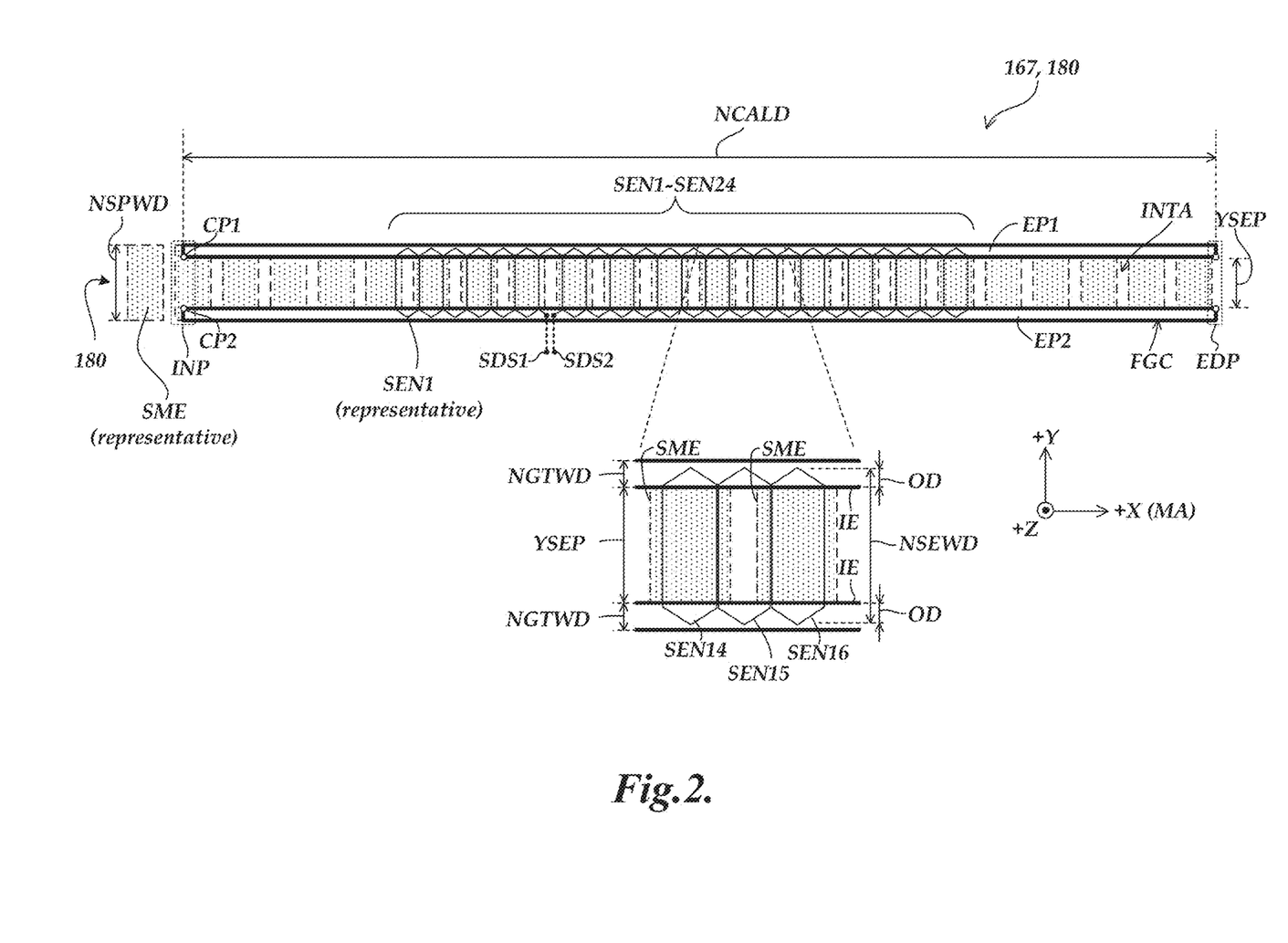
FIG. 2 is a plan view diagram illustrating a first exemplary implementation of a detector portion usable in an electronic position encoder.

FIG. 2 is a plan view diagram of a first exemplary implementation usable as the detector portion 167 and the signal modulating scale pattern 180 in the electronic position encoder shown in FIG. 1, or the like. FIG. 2 may be regarded as partly representational, partly schematic. An enlarged section of the detector portion 167 and scale pattern 180 is illustrated in the lower portion of FIG. 2. In FIG. 2, the various elements described below are represented by their shape or outline, and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on the following description and/or as outlined in greater detail with reference to FIG. 4, below. Throughout the figures of this disclosure, it will be appreciated that the x-axis, y-axis and/or z-axis dimensions of one or more elements may be exaggerated for clarity.

The illustrated portion of the scale pattern 180 includes signal modulating elements SME shown in dashed outline, which are located on the scale 170 (shown in FIG. 1). The y-direction extremes of most of the signal modulating elements SME are hidden below the first and second elongated portions EP1 and EP2 in the embodiment illustrated in FIG. 2. It will be appreciated that the scale pattern 180 moves relative to the detector portion 167 during operation, as may be seen in FIG. 1.

In the example of FIG. 2, the scale pattern 180 has a nominal scale pattern width dimension NSPWD along a y-axis direction that is perpendicular to the x-axis, and comprises discrete signal modulating elements SME that are arranged periodically along the measuring axis direction MA (e.g., corresponding to an x-axis direction). However, more generally the scale pattern 180 may comprise various alternative spatially modulated patterns including discrete elements or one or more continuous pattern element(s), provided that the pattern has a spatial characteristic which changes as a function of position along the x-axis direction, so as to provide position dependent detector signals (also referred to as detector signal components, in some embodiments) arising in the sensing elements SEN (e.g., SEN14) of the detector portion 167, according to known methods.

Figure 4:
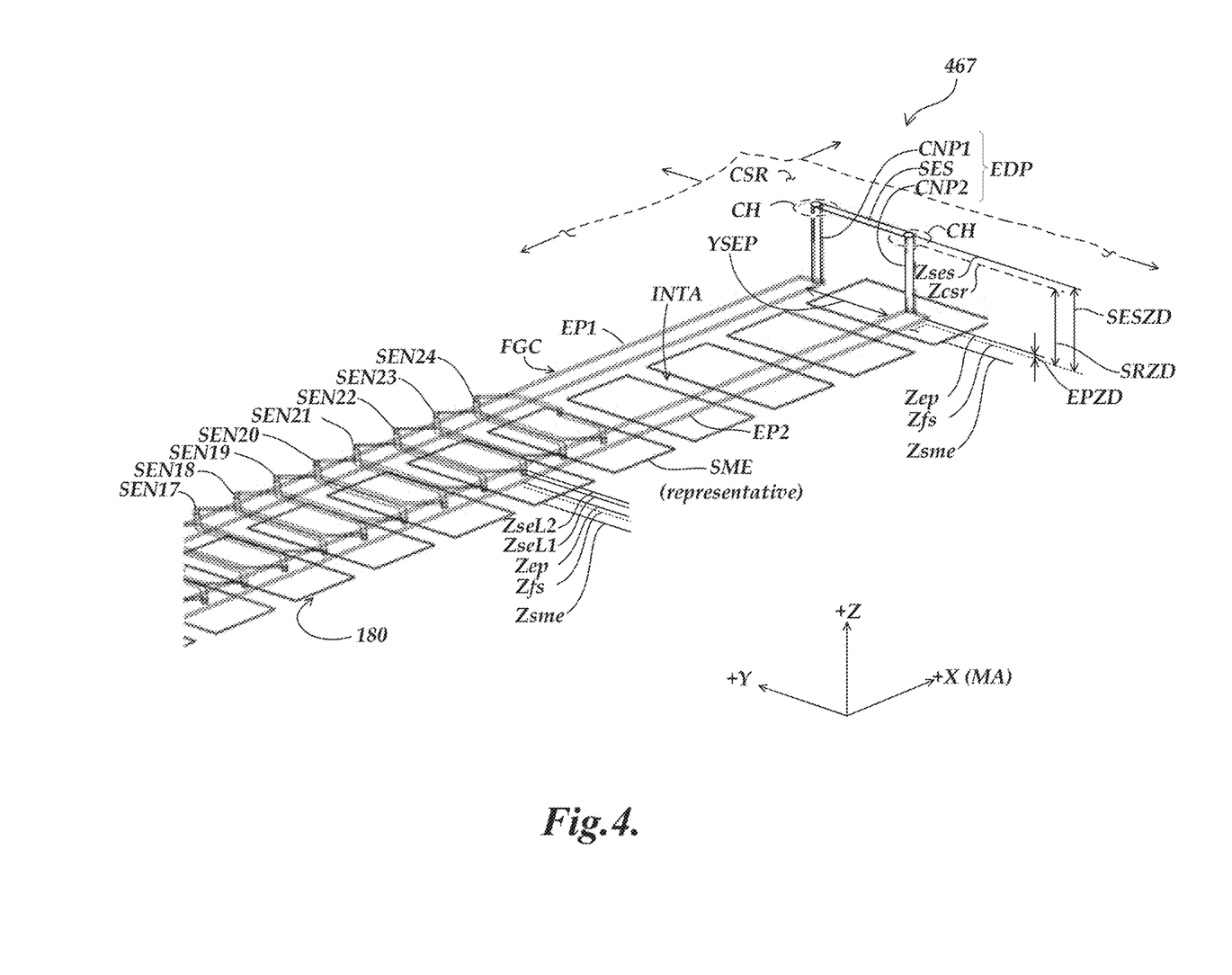
FIG. 4 is an isometric view diagram illustrating a first exemplary implementation of an end portion of a field generating coil of a detector portion.

In various implementations, the detector portion 167 is configured to be mounted proximate to the scale pattern 180, and to move along the measuring axis direction MA relative to the scale pattern 180. The detector portion includes a field generating coil FGC and a plurality of sensing elements, which may take a variety of alternative configurations to be used in combination with a variety of corresponding signal processing schemes in various embodiments, as will be understood by one skilled in the art. FIG. 2 shows a single representative set of sensing elements SEN1-SEN24, which in this particular embodiment comprise sensing loop elements (alternatively referred to as sensing coil elements or sensing winding elements) which are connected in series. In this embodiment, adjacent loop elements are connected by a configuration of conductors on various layers of PCB connected by feedthroughs according to known methods (e.g., as illustrated in FIG. 4) such that they have opposite winding polarities. That is, if a first loop responds to a changing magnetic field with a positive polarity detector signal contribution, then the adjacent loops respond with a negative polarity detector signal contribution. In this particular embodiment, the sensing elements are connected in series such that their detector signals or signal contributions are summed, and a "summed" detector signal is output at the detector signal output connections SDS1 and SDS2 to a signal processing configuration (not shown). Although FIG. 2 shows a single set of sensing elements to avoid visual confusion, it will be appreciated that in some embodiments it is advantageous to configure the detector to provide one or more additional sets of sensing elements at a different spatial phase position (e.g., to provide quadrature signals), as will be understood by one of ordinary skill in the art. However, it should be appreciated that the configurations of sensing elements described herein are exemplary only, and not limiting. As one example, individual sensing element loops may output individual signals to a corresponding signal processing configuration in some embodiments, for example as disclosed in commonly assigned copending U.S. patent application Ser. No. 15/199,723, filed Jun. 30, 2016, which is hereby incorporated by reference in its entirety. More generally, various known sensing element configurations may be used in combination with the principles disclosed and claimed herein, for use in combination with various known scale pattern and signal processing schemes, in various embodiments.

The various sensing elements and the field generating coil FGC may be fixed on a substrate (e.g., substrate 162 of FIG. 1). The field generating coil FGC may be described as surrounding an interior area INTA having a nominal coil area length dimension NCALD along the x-axis direction and a nominal coil area width dimension of approximately YSEP along the y-axis direction. In various implementations, the field generating coil FGC may comprise a single turn surrounding the interior area INTA. In operation, the field generating coil FGC generates a changing magnetic flux in the interior area INTA in response to a coil drive signal.

In various implementations, the field generating coil FGC may include an input portion INP, first and second elongated portions EP1 and EP2, and an end portion EDP (e.g., implemented as disclosed with reference to FIGS. 4 and/or 5). The input portion INP includes first and second connection portions CP1 and CP2 that connect a coil drive signal from a signal processing configuration (e.g., the signal processing configuration 166 of FIG. 1, or the signal processing configuration 766 of FIG. 6, etc.) to the field generating coil FGC. The first and second connection portions CP1 and CP2 may be connected to the signal processing configuration through printed circuit board feedthroughs or the like, and the connections may also be shielded utilizing principles analogous to those disclosed below with reference to the end portion EDP, in some embodiments. The first and second elongated portions EP1 and EP2 each extend along the x-axis direction adjacent to a side of the interior area INTA, and have a nominal generating trace width dimension NGTWD along the y-axis direction. In the illustrated embodiment, the nominal generating trace width dimensions NGTWD are the same for EP1 and EP2, but this is not a requirement in all embodiments. The end portion EDP (e.g., implemented as disclosed with reference to FIGS. 4 and/or 5) spans the y-axis direction separation corresponding to the nominal coil width dimension YSEP between the first and second elongated portions EP1 and EP2 to provide a connection therebetween near an end of the interior area INTA. In various implementations according to principles disclosed herein, the field generating coil FGC is advantageously configured using a design ratio wherein each nominal generating trace width dimension NGTWD is at least 0.1 times the nominal coil area width dimension YSEP. In some implementations, the field generating coil FGC may be configured such that each nominal generating trace width dimension NGTWD is at least 0.15 times, or at least 0.25 times, or at least 0.50 times the nominal coil area width dimension YSEP. In some implementations, the field generating coil FGC may be configured such that each nominal generating trace width dimension NGTWD is at least 25 times the skin depth of the elongated portions EP1 and EP2 at a nominal operating frequency defined corresponding to detector signals that arise in response to the changing magnetic flux.

The sensing elements SEN1-SEN24 are arranged along the x-axis direction (e.g., corresponding to the measuring axis direction MA) and are fixed on the substrate (e.g., substrate 162 of FIG. 1). In the example of FIG. 2, each of the sensing elements SEN has a nominal sensing element width dimension NSEWD along the y-axis direction, wherein at least a majority of the nominal sensing element width dimension NSEWD is included within the nominal coil area width dimension YSEP along the y-axis direction. The sensing elements SEN are configured to provide detector signals which respond to a local effect on the changing magnetic flux provided by an adjacent signal modulating portion of the scale pattern 180 (e.g., one or more signal modulating elements SME) of the scale 170. A signal processing configuration (e.g., the signal processing configuration 166 of FIG. 1, or the signal processing configuration 766 of FIG. 6, etc.) may be configured to determine a position of the plurality of sensing elements SEN1-SEN24 relative to the scale 170 based on the detector signals input from the detector portion 167. In general, the field generating coil FGC and the sensing elements SEN1-SEN24, or the like, may operate according to known principles (e.g., for inductive encoders), such as those described in the incorporated references.

In various implementations, the field generating coil FGC and the sensing elements SEN are insulated from one another (e.g., as located in different layers of a printed circuit board, etc.). In one such implementation, the nominal sensing element width dimension NSEWD of at least one sensing element SEN is advantageously greater than the nominal coil area width dimension YSEP and extends beyond an interior edge IE of at least one of the elongated portions EP1 or EP2 by an amount defined as an overlap dimension OD. In addition, the field generating coil FGC may be advantageously configured such that each nominal generating trace width dimension NGTWD is larger than the corresponding overlap dimension OD, in various embodiments. In various implementations, the elongated portions EP1 and EP2 may be fabricated on a first layer of a printed circuit board, and the sensing elements SEN may comprise conductive loops fabricated in one or more layers of the printed circuit board that include a layer different than the first layer, at least in the vicinity of the overlap dimension OD.

In various implementations, the substrate may comprise a printed circuit board, and the field generating coil FGC may comprise conductive traces (e.g., including the elongated portions EP1 and EP2) fabricated on the printed circuit board. In various implementations, the sensing elements SEN may comprise magnetic flux sensing loops formed by conductive traces fabricated on the printed circuit board. As described above with respect to FIG. 1, in various implementations the detector portion 167 may be included in various types of measurement instruments (e.g., calipers, micrometers, gauges, linear scales, etc.). For example, the detector portion 167 may be fixed to a slide member, and the scale pattern 180 may be fixed to a beam member having a measuring axis that coincides with an x-axis direction. In such a configuration, the slide member may be movably mounted on the beam member and movable along the measuring axis direction MA in a plane that extends along the x-axis direction and a y-axis direction, with a z-axis direction being orthogonal to the plane.

Figure 3:
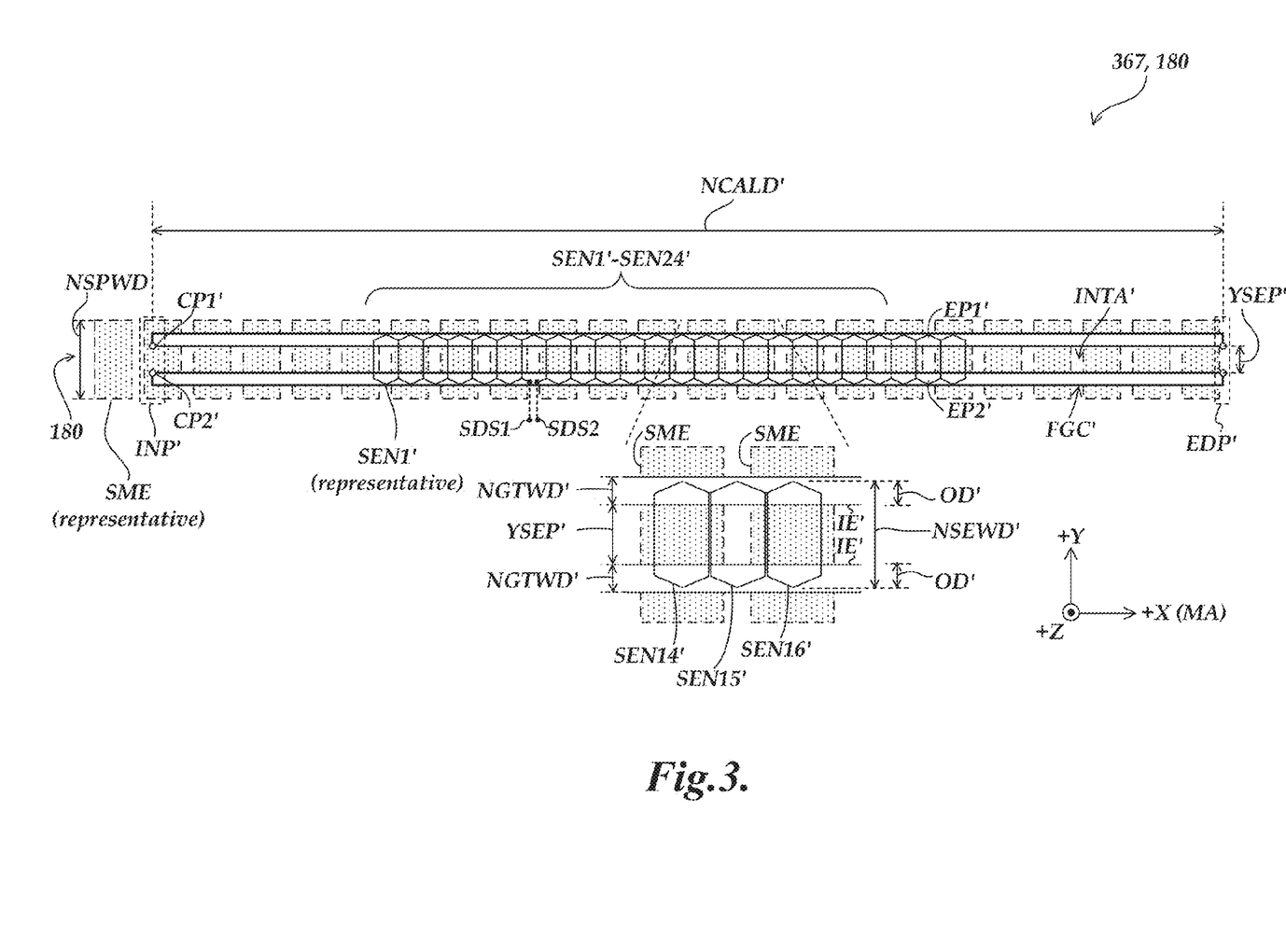
FIG. 3 is a plan view diagram illustrating a second exemplary implementation of a detector portion usable in an electronic position encoder.

FIG. 3 is a plan view diagram illustrating a second exemplary implementation of a detector portion 367 usable as the detector portion 167 in the electronic position encoder shown in FIG. 1, or the like. The detector portion 367 has characteristics and components similar to the detector portion 167 of FIG. 2, and its design and operation are configured to fulfill various design principles disclosed and claimed herein. In particular, the elements designated by "primed" reference numbers in FIG. 3 are analogous to elements having the corresponding similar "unprimed" reference numbers in FIG. 2, and may be understood to operate similarly, except as otherwise indicated below.

The primary difference between the embodiments of FIG. 3 and FIG. 2 is that the detector portion 367 is narrower than the detector portion 167 along the y-axis direction, such that the nominal scale pattern width dimension NSPWD is significantly larger than the nominal sensing element width dimension NSEWD' and other y-axis dimensions of the detector portion 367. For example, in one specific implementation, the nominal sensing element width dimension NSEWD' may be approximately ⅔ or less of the nominal scale pattern width dimension NSPWD. In various implementations, such configurations may result in a greater lateral offset tolerance with respect to a lateral movement of the detector portion 367 relative to the scale pattern 180.

Despite this difference, other features of the detector portion 367 may be analogous to those of the detector portion 167. For example, each of the sensing elements SEN' may have a nominal sensing element width dimension NSEWD' along the y-axis direction, wherein at least a majority of the nominal sensing element width dimension NSEWD' is included within the nominal coil area width dimension YSEP' along the y-axis direction. In various implementations, the field generating coil FGC' includes the first and second elongated portions EP1' and EP2', and an end portion EDP' (e.g., implemented as disclosed with reference to FIGS. 4 and/or 5), all of which may have analogous configurations to the corresponding elements of the detector portion 167. In some implementations, the field generating coil FGC' may be configured such that the nominal trace width dimension NGTWD' is at least 0.10 times, or at least 0.15 times, or at least 0.25 times, or at least 0.50 times the nominal coil area width dimension YSEP'. Other features and/or design relationships may also be made analogous to those described with reference to FIG. 2, if desired.

With respect to the example configurations of the detector portions 167 and 367 that are described above, it will be appreciated that certain prior systems utilized relatively narrower traces and/or relatively larger interior area (e.g., larger area INTA and/or nominal coil area width dimension YSEP) for field generating coils. More specifically, in certain prior systems it was generally considered to be desirable for the related detector portion elements to have a relatively high inductance such that the system would have a high enough Q to resonate for a relatively long period of time, as was considered advantageous with respect to the signal processing and measurement methods that were utilized. In contrast, in accordance with the principles disclosed herein, a wider trace width is utilized (e.g., at the expense of INTA and/or YSEP, for an overall detector y-axis dimension limit imposed by a particular application), which results in a relatively smaller inductance and also a smaller overall impedance, for which a greater amount of current is able to flow in a relatively shorter period of time (e.g., producing a stronger signal), and resonance is still able to be achieved for a desired length of time for a measurement. As noted above with respect to the detector portions 167 and 367, in various implementations each nominal generating trace width dimension NGTWD is at least 0.10 times, or at least 0.15 times, or at least 0.25 times, or at least 0.50 times the nominal coil area width dimension YSEP. As some specific example values, in certain implementations, the nominal coil area width dimension YSEP may be on the order of 2.0 mm, or 8.0 mm, or 10 mm, and each nominal generating trace width dimension NGTWD may be on the order of at least approximately 0.25 mm, or 0.50 mm, or 1.00 mm, or larger. These may be compared with trace widths in certain prior systems that were on the order of 0.10 mm. Configurations such as those disclosed herein have been determined in some instances to achieve detector signal levels that exceed the signal levels of comparable prior art configurations by a factor of 1.5 or more, and in some instances by a factor of 3 or more, when inputting a comparable driving signal to the field generating coil.

With respect to the example configurations of the detector portions 167 and 367, and the like, in various implementations the sensing elements SEN (e.g., area-enclosing loop or coil elements as illustrated in FIGS. 2 and 3) may provide certain advantages (e.g., increased gain, etc.) over more conventional sensing elements, if they are configured in accordance with a maximum signal gain design principle disclosed here, wherein the amount of a sensing element field-receiving area coinciding with or located inside a field generating coil FGC (e.g., in INTA) should be relatively maximized, while the amount of sensing element field-receiving area located outside of the conductors that form a field generating coil FGC (e.g., along the y-axis direction) should be relatively minimized. It will be appreciated that the sensing elements SEN shown in FIGS. 2 and 3 exhibit an overlap dimension OD having design relationships outlined above which conform with this principle. For example, each nominal generating trace width dimension NGTWD is made to be larger than the corresponding overlap dimension OD.

FIG. 4 is an isometric view "wire frame" diagram illustrating a first exemplary implementation of an end portion EDP of a field generating coil FGC included in a detector portion 467, according to principles disclosed and claimed herein. It will be appreciated that the elements of the detector portion 467 may have be designed and operated similarly to the similarly numbered elements of the detector portion 167 of FIG. 2, and may be generally be understood by analogy thereto. The detector portion 467 includes the field generating coil FGC and the plurality of sensing elements SEN1-SEN24 (representative sensing elements SEN17-SEN24 are illustrated in FIG. 4). The field generating coil FGC includes the first and second elongated portions EP1 and EP2 and the end portion EDP and is fixed on a substrate (e.g., substrate 162 of FIG. 1) and surrounds the interior area INTA.

In various implementations, the field generating coil FGC and the sensing elements SEN are insulated from one another, e.g., as located in different layers of a printed circuit board (the layer structure is not explicitly shown in FIG. 4). In FIG. 4, the various labeled Z coordinates may be understood to coincide with or identify respective surfaces of various printed circuit board (PCB) layers, although alternative fabrication methods may be used. The elements SME of the scale pattern 180 reside on a surface of the scale 170 (shown in FIG. 1), at a Z coordinate Zsme. It will be understood that the scale 170 is separate from the printed circuit board (PCB) that carries the elements of the detector portion 467. In the embodiment shown in FIG. 4, the PCB has a front surface (e.g., a front surface of an insulative coating) located at a Z coordinate Zfs. An operating gap exists between the scale element Z coordinate Zsme and the front surface Z coordinate Zfs. The elongated portions EP1 and EP2 may be fabricated on a PCB layer surface having a Z coordinate Zep, and they may be covered by the insulative coating. The sensing elements SEN may comprise interconnected conductive loop portions that reside on respective PCB layer surfaces having Z coordinates ZseL1 and ZseL2. The conductive loop portions may be connected between the layers using feedthroughs, such that the conductors may cross over one another while connecting the sensing elements' signal contributions in a serial manner and providing respective signal contribution polarities, as previously outlined.

The first and second elongated portions EP1 and EP2 each extend along the x-axis direction and are nominally located at the elongated portion z distance EPZD=(Zep−Zsme) from the front surface of the PCB of the detector portion 467 that faces the scale pattern 180, along a z-axis direction that is perpendicular to the x-axis and y-axis directions. As noted above, the end portion EDP comprises a conductive path that spans a y-axis direction separation corresponding to the nominal coil area width dimension YSEP between the first and second elongated portions EP1 and EP2 to provide a connection therebetween near an end of the interior area INTA. In the embodiment shown in FIG. 4, the end portion EDP includes a shielded end section SES that resides on a respective PCB layer surface having a Z coordinate Zses, which is nominally located at a shielded end section z distance SESZD=(Zses−Zfs) from the front surface of the PCB of the detector portion 467, wherein the shielded end section z distance SESZD is greater than the elongated portion z distance EPZD. A first connection portion CNP1 (e.g., a PCB feedthrough) connects the first elongated portion EP1 to a first end of the shielded end section SES, and a second connection portion CNP2 (e.g., a PCB feedthrough) connects the second elongated portion EP2 to a second end of the shielded end section SES.

In the implementation shown in FIG. 4, the detector portion 467 further includes a conductive shield region CSR (e.g., a conductive plane region represented by somewhat arbitrarily placed dashed "edge" lines in FIG. 4), extending along the x-axis and y-axis directions and nominally located on a respective PCB layer surface having a Z coordinate Zcsr, which is nominally located at a shield region z distance SRZD=(Zcsr−Zfs) from the front surface of the PCB of the detector portion 467. In various implementations, the shield region z distance SRZD is smaller than the shielded end section z distance SESZD, and the conductive shield region CSR is located between at least part of the shielded end section SES and the front surface of the PCB of the detector portion 467. The conductive shield region CSR may comprise a portion of an extensive ground plane layer in the PCB of the detector portion 467, or it may comprise a discrete region in some embodiments. The conductive shield region CSR may include clearance holes such that the first and second connection portion CNP1 (e.g., PCB feedthroughs) are separated from or insulated from the conductive shield region CSR.

In general, the field components generated by the previously known configurations for the end portions of field generating coils (e.g., end portions that extend along the y-axis direction) have caused error components to arise in the detector signals of the sensing elements closest to them—a so-called "end effect". It has been attempted to mitigate this end effect using "tapered end configurations" in the detector, and/or by spacing the end portions far from the end sensing elements. However, these approaches undesirably reduce signal strength, or increase the detector x-axis dimension, or both. In contrast, the shielding configuration outlined above tends to reduce the field component generated by the end portions and/or prevent it from reaching the signal modulating elements SME. As such, the field component that is coupled to the closest sensing elements is smaller and/or approximately constant regardless of the scale position, thus substantially mitigating any end effect.

As indicated above, in various implementations the elongated portions EP1 and EP2 may be fabricated on a first layer of a printed circuit board, the shielded end section SES may be fabricated on a second layer of the printed circuit board, and the conductive shield region CSR is fabricated on a layer of the circuit board that is closer to the front surface of the detector (e.g., the front surface of a PCB of the detector) than the second layer of the printed circuit board. In one such implementation, the conductive shield region CSR may be fabricated on a layer of the printed circuit board that is located between the first layer and the second layer. In such a configuration, the conductive shield region CSR may comprise at least a portion of a ground plane layer of the printed circuit board, wherein the ground plane layer is located between the first layer and the second layer. In one implementation, a connection (e.g., as part of the first or second connection portions CNP1 or CNP2) between an elongated portion EP1 or EP2 and the shielded end section SES may include a printed circuit board feedthrough that extends along the z-axis direction. In one such configuration, the conductive shield region CSR may be fabricated on a layer of the printed circuit board that is located between the first layer and the second layer, and the printed circuit board feedthrough may pass through an opening fabricated in the conductive shield region CSR.

Figure 5:
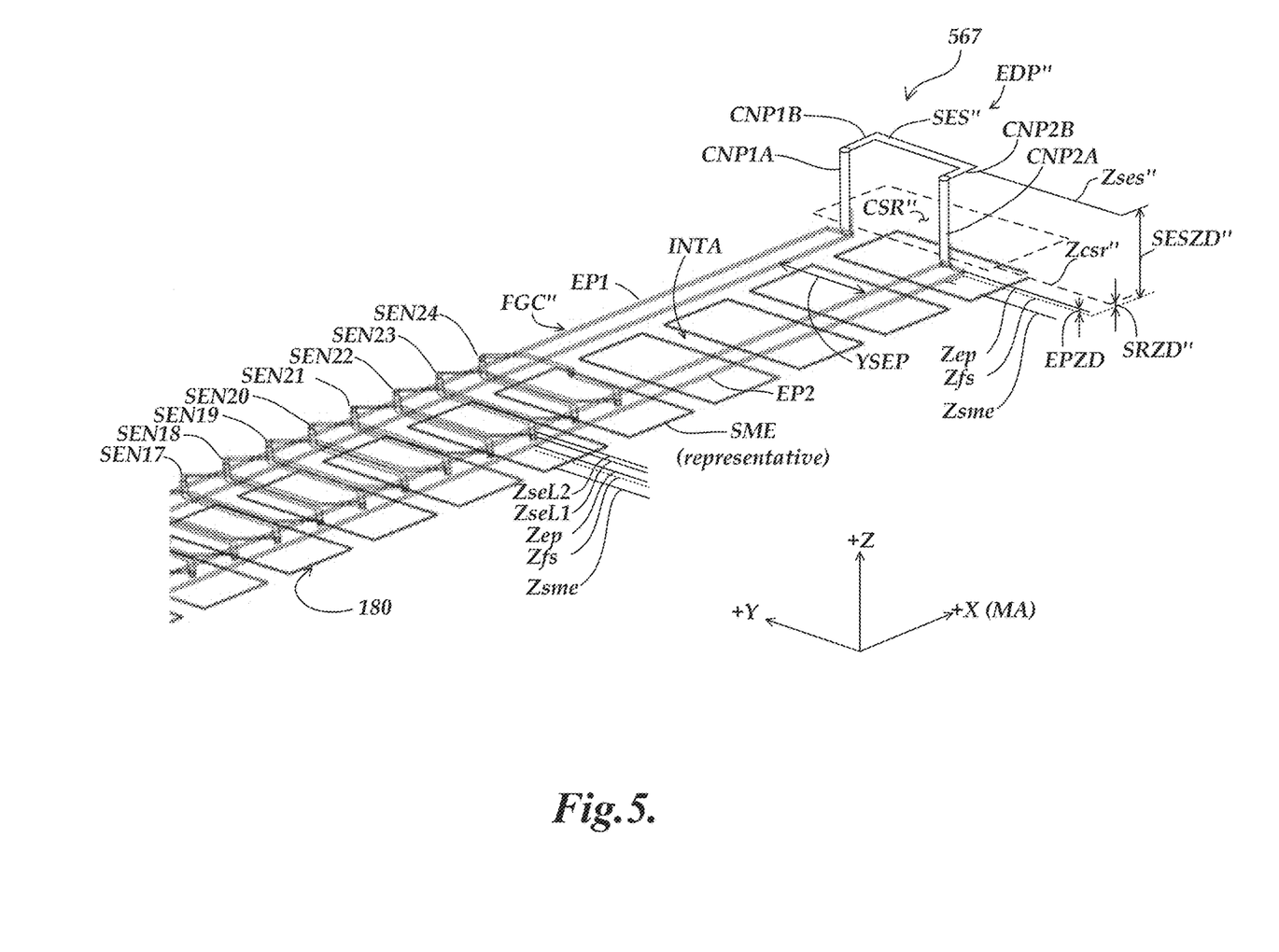
FIG. 5 is an isometric view diagram illustrating a second exemplary implementation of an end portion of a field generating coil of a detector portion.

FIG. 5 is an isometric view "wire frame" diagram illustrating a second exemplary implementation of an end portion EDP" of a field generating coil FGC" included in a detector portion 567, according to principles disclosed and claimed herein. It will be appreciated that the elements of the detector portion 567 may be designed and operated similarly to the similarly numbered elements of the detector portion 167 of FIG. 2, and/or the detector portion 467 of FIG. 4, and may be generally understood by analogy thereto.

In FIG. 5, as in FIG. 4, the various labeled Z coordinates may be understood to coincide with or identify respective surfaces of various printed circuit board (PCB) layers, although alternative fabrication methods may be used. The elements SME of the scale pattern 180 reside on a surface of the scale 170 (shown in FIG. 1), at a Z coordinate Zsme. The detector portion 567 has a front surface (e.g., a front surface of an insulative coating on a PCB of the detector portion 567) located at a Z coordinate Zfs. An operating gap exists between the scale element Z coordinate Zsme and the front surface Z coordinate Zfs. The elongated portions EP1 and EP2 may be fabricated on a PCB layer surface having a Z coordinate Zep, and may be covered by the insulative coating. The sensing elements SEN may comprise interconnected conductive loop portions that reside on respective PCB layer surfaces having Z coordinates ZseL1 and ZseL2, connected as previously outlined with reference to the detector portion 467.

The first and second elongated portions EP1 and EP2 are nominally located at the elongated portion z distance EPZD=(Zep-Zsme) from the front surface of the detector portion 567 that faces the scale pattern 180. As in the detector portion 467, the end portion EDP" comprises a conductive path that spans a y-axis direction separation corresponding to the nominal coil area width dimension YSEP between the first and second elongated portions EP1 and EP2 to provide a connection therebetween near an end of the interior area INTA. In the embodiment shown in FIG. 5, the end portion EDP" includes a shielded end section SES" that resides on respective PCB layer surface having a Z coordinate Zses", which is nominally located at a shielded end section z distance SESZD"=(Zses"-Zfs) from the front surface of the detector portion 567, wherein the shielded end section z distance SESZD" is greater than the elongated portion z distance EPZD. A first connection portion CNP1 (e.g., comprising a PCB feedthrough CNP1A and a conductive trace CNP1B) connects the first elongated portion EP1 to a first end of the shielded end section SES, and a second connection portion CNP2 (e.g., comprising a PCB feedthrough CNP2A and a conductive trace CNP2B) connects the second elongated portion EP2 to a second end of the shielded end section SES.

In the implementation shown in FIG. 4, the detector portion 567 further includes a conductive shield region CSR" (e.g., a conductive plane region represented by dashed edge lines in FIG. 5), extending along the x-axis and y-axis directions and nominally located on respective PCB layer surface having a Z coordinate Zcsr", which is nominally located at a shield region z distance SRZD"=(Zcsr"-Zfs) from the front surface of the PCB of the detector portion 467. In various implementations, the shield region z distance SRZD" is smaller than the shielded end section z distance SESZD", and the conductive shield region CSR" is located between at least part of the shielded end section SES" and the front surface of the PCB of the detector portion 567. For the embodiment shown in FIG. 5, it should be appreciated that in some implementations the shield region CSR" may be located on the same surface as the elongated portions EP1 and EP2, if desired (that is, Zcsr"=Zep and EPZD=SRZD", if desired). Furthermore, in one such implementation, the shielded end section SES" and the conductive traces CNP1B and CNP2B may be located on the same surface(s) used for sensing elements SEN, if desired (that is, Zses"=ZseL1 or Zses"=ZseL2, and so on, if desired). In such implementations, a PCB of the detector portion 567 may comprise fewer layers and/or be thinner along the z-axis direction than the detector portion 467. In any case, the shielded configuration of the end portion EDP" in the detector portion 567 mitigates end effects in a manner analogous to that previously outlined with reference to the end portion EDP in the detector portion 467.

With respect to the example detector portions 467 and 567 described above, it will be appreciated that the conductive shield region(s) CSR (CSR") may reduce the effect (e.g., related to the changing magnetic flux) of the shielded end section SES on the sensing elements SEN, based at least in part on the relative layer location of the shielded end section SES (e.g., as located on a different PCB layer, etc.) as compared to the layer location of the elongated portions EP1 and EP2 of the field generating coil FGC. Such configurations may enable utilization of conductive shield region(s) CSR (CSR") and allow a shorter overall x-axis dimension for the field generating coil FGC (e.g., for which the end portion EDP does not need to be located as far away from the sensing elements SEN in order to avoid influencing the detector signals that arise in response to the changing magnetic flux, etc.).

Figure 6:
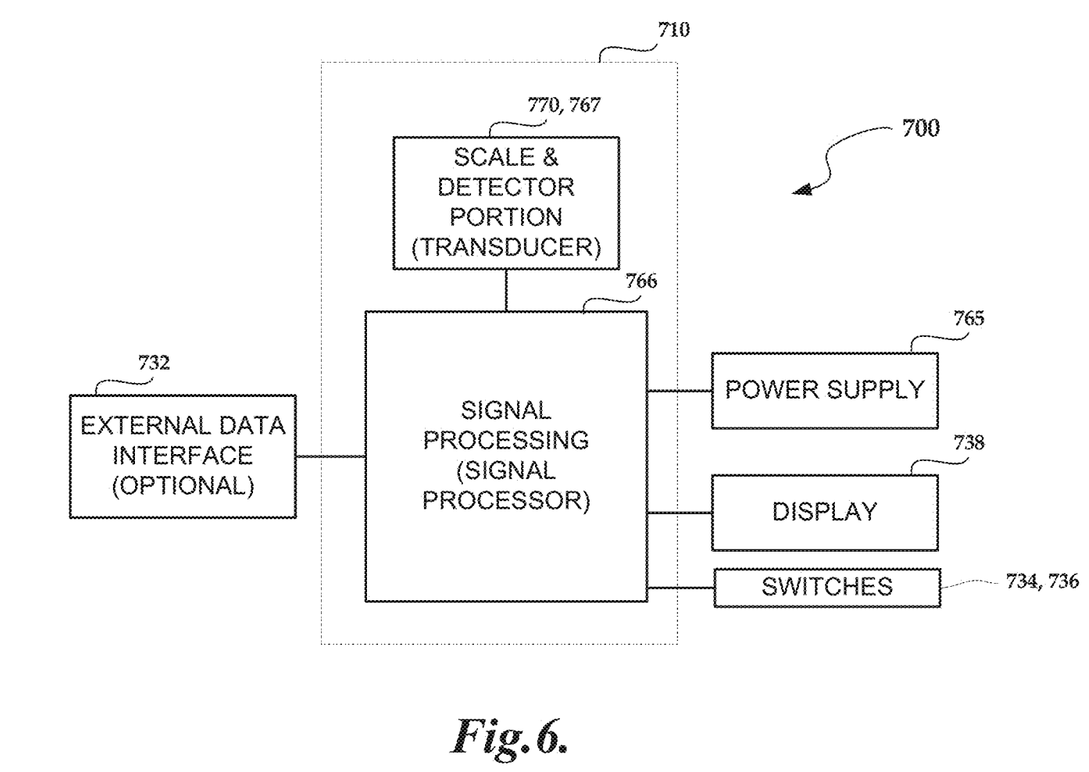
FIG. 6 is a block diagram illustrating one exemplary implementation of components of a measurement system including an electronic position encoder.

FIG. 6 is a block diagram illustrating one exemplary implementation of components of a measurement system 700 including an electronic position encoder 710. It will be appreciated that certain numbered components 7XX of FIG. 6 may correspond to and/or have similar operations as similarly numbered components 1XX of FIG. 1, except as otherwise described below. The electronic position encoder 710 includes a scale 770 and a detector portion 767, which together form a transducer, and a signal processing configuration 766. In various implementations, the detector portion 767 may include any of the configurations described above with respect to FIGS. 2-6, or other configurations. The measurement system 700 also includes user interface features such as a display 738 and user-operable switches 734 and 736, and may additionally include a power supply 765. In various implementations, an external data interface 732 may also be included. All of these elements are coupled to the signal processing configuration 766 (or signal processing and control circuit), which may be embodied as a signal processor. The signal processing configuration 766 determines a position of the sensing elements of the detector portion 767 relative to the scale 770 based on detector signals input from the detector portion 767.

In various implementations, the signal processing configuration 766 of FIG. 6 (and/or the signal processing configuration 166 of FIG. 1) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

As one example, the embodiments shown and described with reference to FIGS. 2 and 3 utilize an overlap dimension OD which is non-zero, but this is not a requirement in all embodiments. In some embodiments, the maximum signal gain design principle outlined above may be compromised (e.g., in a design that has no overlap dimension, or zero overlap dimension) to gain certain other design advantages. In one such embodiment, the sensing elements SEN may have a nominal sensing element width dimension NSEWD along the y-axis direction, wherein the nominal sensing element width dimension NSEWD is less than the nominal coil area width dimension YSEP along the y-axis direction. Such a configuration enables the sensing elements SEN to be fabricated on the same layer(s) of a printed circuit board as the field generating coil FGC, which in some instances may provide certain advantages. For example, by being fabricated in the same layer(s), the plurality of sensing elements SEN and the field generating coil FGC may both be located as close as possible to the scale pattern 180 (e.g., for which smaller separation distances may result in greater signal strength, robustness, efficiencies, etc., for a corresponding detector portion).

The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder comprising:
a scale extending along a measuring axis direction that coincides with an x-axis direction and including a signal modulating scale pattern, the scale pattern having a scale pattern width dimension along a y-axis direction that is perpendicular to the x-axis direction, and the scale pattern comprising a spatial characteristic which changes as a function of position along the x-axis direction;
a detector portion configured to be mounted proximate to the scale pattern and to move along the measuring axis direction relative to the scale pattern, the detector portion comprising:
a field generating coil fixed on a substrate, the field generating coil including an input portion, first and second elongated portions and at least a first end portion, the field generating coil surrounding an interior area having a nominal coil area length dimension along the x-axis direction and a nominal coil area width dimension along the y-axis direction, the nominal coil area width dimension extending from the first elongated portion to the second elongated portion, the field generating coil generating a changing magnetic flux in the interior area in response to a coil drive signal; and
a plurality of sensing elements arranged along the x-axis direction and fixed on the substrate, each of the sensing elements having a nominal sensing element width dimension along the y-axis direction, wherein at least a majority of the nominal sensing element width dimension is included within the nominal coil area width dimension along the y-axis direction and the plurality of sensing elements are configured to provide detector signals which respond to a local effect on the changing magnetic flux provided by an adjacent signal modulating portion of the scale pattern; and
a signal processing configuration that is operably connected to the detector portion to provide the coil drive signal and that determines a relative position between the detector portion and the scale pattern based on detector signals input from the detector portion,
wherein:
the field generating coil comprises:
the input portion comprising at least two connection portions that connect the coil drive signal from the signal processing configuration to the field generating coil;
the first and second elongated portions each extending along the x-axis direction adjacent to a side of the interior area, the first and second elongated portions each comprising a conductive trace having a nominal generating trace width dimension along the y-axis direction; and
the at least a first end portion spanning a y-axis direction separation between the first and second elongated portions to provide a connection therebetween near an end of the interior area; and
the field generating coil is configured such that the nominal generating trace width dimension is at least 0.1 times the nominal coil area width dimension.

2. The electronic position encoder of claim 1, wherein the nominal generating trace width dimension is at least 0.15 times the nominal coil area width dimension.

3. The electronic position encoder of claim 2, wherein the nominal generating trace width dimension is at least 0.25 times the nominal coil area width dimension.

4. The electronic position encoder of claim 2, wherein the nominal generating trace width dimension is at least 0.5 times the nominal coil area width dimension.

5. The electronic position encoder of claim 1, wherein the nominal generating trace width dimension is at least 25 times a skin depth of the elongated portions at a nominal operating frequency defined corresponding to the detector signals that arise in response to the changing magnetic flux.

6. The electronic position encoder of claim 1, wherein:
the field generating coil and the sensing elements are insulated from one another;
the sensing element width dimension of at least one of the sensing elements is greater than the nominal coil area width dimension and extends beyond an interior edge of at least one of the elongated portions by an amount defined as an overlap dimension; and
the field generating coil is configured such that the nominal generating trace width dimension is larger than the overlap dimension.

7. The electronic position encoder of claim 6, wherein the elongated portions are fabricated in a first layer of a printed circuit board, and the sensing elements comprise conductive loops fabricated in one or more layers of the printed circuit board that include a layer different than the first layer, at least in a vicinity of the overlap dimension.

8. The electronic position encoder of claim 1, wherein the substrate comprises a printed circuit board, and at least the field generating coil comprises conductive traces fabricated on the printed circuit board.

9. The electronic position encoder of claim 8, wherein the sensing elements comprise magnetic flux sensing loops formed by the conductive traces fabricated on the printed circuit board.

10. The electronic position encoder of claim 1, wherein the field generating coil comprises a single turn surrounding the interior area.

11. The electronic position encoder of claim 1, further comprising:
a slide member to which the detector portion is fixed; and
a beam member to which the signal modulating scale pattern is fixed, wherein the slide member is movably mounted on the beam member and movable along the measuring axis direction, such that the relative position between the detector portion and the scale pattern based on detector signals input from the detector portion determined by the signal processing configuration is correspondingly indicative of a relative position between the slide member and the beam member.

12. A measurement system configured to operate in conjunction with a scale, the scale extending along a measuring axis direction that coincides with an x-axis direction and including a signal modulating scale pattern, the scale pattern having a scale pattern width dimension along a y-axis direction that is perpendicular to the x-axis direction, and the scale pattern comprising a spatial characteristic which changes as a function of position along the x-axis direction, the measurement system comprising:
a detector portion configured to be mounted proximate to the scale pattern and to move along the measuring axis direction relative to the scale pattern, the detector portion comprising:
a field generating coil fixed on a substrate, the field generating coil including an input portion, first and second elongated portions and at least a first end portion, the field generating coil surrounding an interior area having a nominal coil area length dimension along the x-axis direction and a nominal coil area width dimension along the y-axis direction, the nominal coil area width dimension extending from the first elongated portion to the second elongated portion, the field generating coil generating a changing magnetic flux in the interior area in response to a coil drive signal; and
a plurality of sensing elements arranged along the x-axis direction and fixed on the substrate, each of the sensing elements having a nominal sensing element width dimension along the y-axis direction, wherein at least a majority of the nominal sensing element width dimension is included within the nominal coil area width dimension along the y-axis direction and the sensing elements are configured to provide detector signals which respond to a local effect on the changing magnetic flux provided by an adjacent signal modulating portion of the scale pattern; and
a signal processing configuration that is operably connected to the detector portion to provide the coil drive signal and that determines a relative position between the detector portion and the scale pattern based on detector signals input from the detector portion,
wherein:
the field generating coil comprises:
the input portion comprising at least two connection portions that connect the coil drive signal from the signal processing configuration to the field generating coil;
the first and second elongated portions each extending along the x-axis direction adjacent to a side of the interior area, the first and second elongated portions each comprising a conductive trace having a nominal generating trace width dimension along the y-axis direction; and
the at least a first end portion spanning a y-axis direction separation between the first and second elongated portions to provide a connection therebetween near an end of the interior area; and
the field generating coil is configured such that the nominal generating trace width dimension is at least 0.1 times the nominal coil area width dimension.

13. An electronic position encoder comprising:
a scale extending along a measuring axis direction that coincides with an x-axis direction and including a signal modulating scale pattern, the scale pattern having a scale pattern width dimension along a y-axis direction that is perpendicular to the x-axis direction, and the scale pattern comprising a spatial characteristic which changes as a function of position along the x-axis direction;
a detector portion configured to be mounted proximate to the scale pattern and to move along the measuring axis direction relative to the scale pattern, the detector portion comprising:
a field generating coil fixed on a substrate, the field generating coil including an input portion, first and second elongated portions and at least a first end portion, the field generating coil surrounding an interior area having a nominal coil area length dimension along the x-axis direction and a nominal coil area width dimension along the y-axis direction, the field generating coil generating a changing magnetic flux in the interior area in response to a coil drive signal; and
a plurality of sensing elements arranged along the x-axis direction and fixed on the substrate, each of the sensing elements having a nominal sensing element width dimension along the y-axis direction, wherein at least a majority of the nominal sensing element width dimension is included within the nominal coil area width dimension along the y-axis direction and the plurality of sensing elements are configured to provide detector signals which respond to a local effect on the changing magnetic flux provided by an adjacent signal modulating portion of the scale pattern; and
a signal processing configuration that is operably connected to the detector portion to provide the coil drive signal and that determines a relative position between the detector portion and the scale pattern based on detector signals input from the detector portion,
wherein:
the field generating coil comprises:
the input portion comprising at least two connection portions that connect the coil drive signal from the signal processing configuration to the field generating coil;
the first and second elongated portions each extending along the x-axis direction and nominally located at an elongated portion z distance from a front surface of the detector portion that faces the scale pattern, along a z axis direction that is perpendicular to the x-axis and y-axis directions; and the at least a first end portion spanning a y-axis direction separation between the first and second elongated portions to provide a connection therebetween, the first end portion comprising a shielded end section that is nominally located at a shielded end section z distance from the front surface of the detector portion, wherein the shielded end section z distance is greater than the elongated portion z distance; and the detector portion further comprises a conductive shield region extending along the x-axis and y-axis directions and nominally located at a shield region z distance from the front surface, wherein the shield region z distance is smaller than the shielded end section z distance, and the shield region is located between at least part of the shielded end section and the front surface of the detector portion.

14. The electronic position encoder of claim 13, wherein the elongated portions are fabricated in a first layer of a printed circuit board, the shielded end section is fabricated in a second layer of the printed circuit board, and the shield region is fabricated in a layer of the circuit board that is closer to the front surface than the second layer of the printed circuit board.

15. The electronic position encoder of claim 14, wherein the layer of the printed circuit board in which the shield region is fabricated is located between the first layer and the second layer.

16. The electronic position encoder of claim 15, wherein the shield region comprises at least a portion of a ground plane layer of the printed circuit board, wherein the ground plane layer is located between the first layer and the second layer.

17. The electronic position encoder of claim 14, wherein the shield region is fabricated in the first layer of the printed circuit board.

18. The electronic position encoder of claim 14, wherein connections between the first and second elongated portions and the shielded end section comprise printed circuit board feedthroughs that extend along the z-axis direction.

19. The electronic position encoder of claim 18, wherein the layer of the printed circuit board in which the shield region is fabricated is located between the first layer and the second layer, and the printed circuit board feedthrough passes through an opening fabricated in the shield region.

20. The electronic position encoder of claim 13, wherein the first and second elongated portions each have a nominal generating trace width dimension along the y-axis direction and the field generating coil is configured such that the nominal generating trace width dimension is at least 0.1 times the nominal coil area width dimension.

* * * * *